United States Patent
Williams

[11] 3,935,753
[45] Feb. 3, 1976

[54] POSITIVE DRIVE DIFFERENTIAL

[75] Inventor: Richard D. Williams, Vancouver, Wash.

[73] Assignee: Warn Industries, Inc., Kent, Wash.

[22] Filed: Feb. 18, 1975

[21] Appl. No.: 550,180

[52] U.S. Cl. .................................. 74/650; 192/50
[51] Int. Cl.² ........................................ F16H 35/04
[58] Field of Search ......................... 74/650; 192/50

[56] References Cited
UNITED STATES PATENTS

| | | | |
|---|---|---|---|
| 1,175,300 | 3/1916 | Ross | 74/650 |
| 3,283,611 | 11/1966 | Weismann et al. | 74/650 |
| 3,700,082 | 10/1972 | Schwab | 74/650 |

*Primary Examiner*—Samuel Scott
*Assistant Examiner*—John Reep
*Attorney, Agent, or Firm*—Graybeal, Barnard, Uhlir & Hughes

[57] ABSTRACT

A positive drive differential to drive either or both of a pair of co-axially mounted axle-driving hubs, and to permit free overrun of either hub. There are two sets of roller clutch elements between the two hubs and the drive casing, and these are positioned in two cages having inwardly extending radial flanges located proximate each other between the two hubs. A pair of contiguous spring loaded washers, mounted centrally in the differential, press axially outwardly against the cage flanges to cause frictional engagement of the cage flanges with the hubs. This in turn causes the hubs to be further pressed outwardly against the drive casing to cause frictional engagement of the two hubs with the drive casing.

11 Claims, 3 Drawing Figures

POSITIVE DRIVE DIFFERENTIAL

BACKGROUND OF THE INVENTION

1. Field of the Invention

The present invention relates to positive drive differentials of a type which drive either or both of a pair of drive axles, while permitting free overrun of either axle.

2. Brief Description of the Prior Art

A common type of positive drive differential long known in the prior art is that which has a basic configuration comprising an outer drive casing, having flattened or rounded cam or drive surfaces, two axially aligned inner hubs each engaging a respective drive axle, and a roller clutch assembly positioned around the hubs so as to be interposed between the hubs and the drive casing. There are two sets of roller clutch elements, each set being mounted in a respective roller cage, which keeps its roller elements properly positioned around the periphery of the hub. The two cages are interlocked in a manner to provide limited relative rotation of the cages so that one of the hub members is permitted to overrun, without causing the roller elements of the overrunning member to lock up in the opposite direction and thus prevent the free overrun.

For proper operation of this type of positive drive differential, there must be some frictional means provided between the roller cage assembly and the inner driven hub members, so that the cage assembly tends to rotate with the hub members rather than the drive casing, this being necessary for proper clutching engagement of the drive casing with the hubs. Also, for operation of the differential without "clutch chatter", there should be frictional means between the driven hub members and the drive casing itself. This particular phenomenon of clutch chatter is described in detail in the Weismann et al. patent, U.S. Pat. No. 3,283,611. This patent shows a positive drive differential wherein friction between the cage and the driven member is provided by wire springs which are mounted in the cages and press against the driven members. In this Weismann et al. patent, frictional engagement between the driven hub members and the drive casing is accomplished by placing spring means between the two driven hubs, which press the hubs axially outwardly against the drive casing.

To cite other examples of the prior art, U.S. Pat. No. 3,581,597, Reiersgaard, provides friction means between the two cages and the driven hubs by a first set of O-rings, and friction between the cages and the drive casing by means of a second set of O-rings. U.S. Pat. No. 3,447,396, Seliger, also provides two sets of O-rings for frictional engagement, but the second set of O-rings provides friction between the drive casing and the driven hub. U.S. Pat. No. 3,700,082, Schwab, illustrates a positive drive differential where the two cages have inwardly extending radial flanges positioned at a location axially outwardly from the two driven hub members. A pair of spring loaded friction plugs mounted in the two hub members press outwardly against the two cage flanges to press these two cage flanges against the drive casing. Thus there is frictional engagement from the driven hubs to the cages, and from the cages to the drive casing

SUMMARY OF THE INVENTION

The differential drive mechanism of the present invention comprises an outer drive casing, a pair of axially aligned inner driven hubs, two sets of roller clutch elements positioned between the drive casing and the hubs, and a pair of cage members, each engaging a respective set of the clutch elements and maintaining its clutch elements in properly spaced relationship around its related hub, with the cages being interconnected in a manner to permit limited relative rotational movement thereof about the longitudinal axis of the transmission. Each cage member has a radially inwardly extending flange, with these two cage flanges being located proximate one another between the inner axial ends of the two hubs. Also, positioned between the axial inner ends of the two hubs are two spring members which press outwardly from one another, with each spring member engaging a respective one of the cage flanges so as to press its respective cage flange axially outwardly into frictional engagement with its related driven hub. The urging of the two spring members also causes the axially outer ends of the two hubs to frictionally engage the drive casing. The frictional force exerted by the two inner spring members tending to limit rotational movement of the cages with respect to one another is less than the force of the frictional engagement of the two cage flanges against the related driven hub. In the preferred form, this is accomplished by providing two spring loaded washers, centered on the longitudinal axis of the transmission, which washers press against one another by the radial inward portions thereof, and press against the two cage flanges by the perimeter portions of the two spring loaded washers. The two cage flanges have axially inwardly protruding interengaging tabs to limit relative rotation of the cages, and the spring washers are positioned radially within these tabs.

DESCRIPTION OF THE PREFERRED EMBODIMENT

Figure 2:
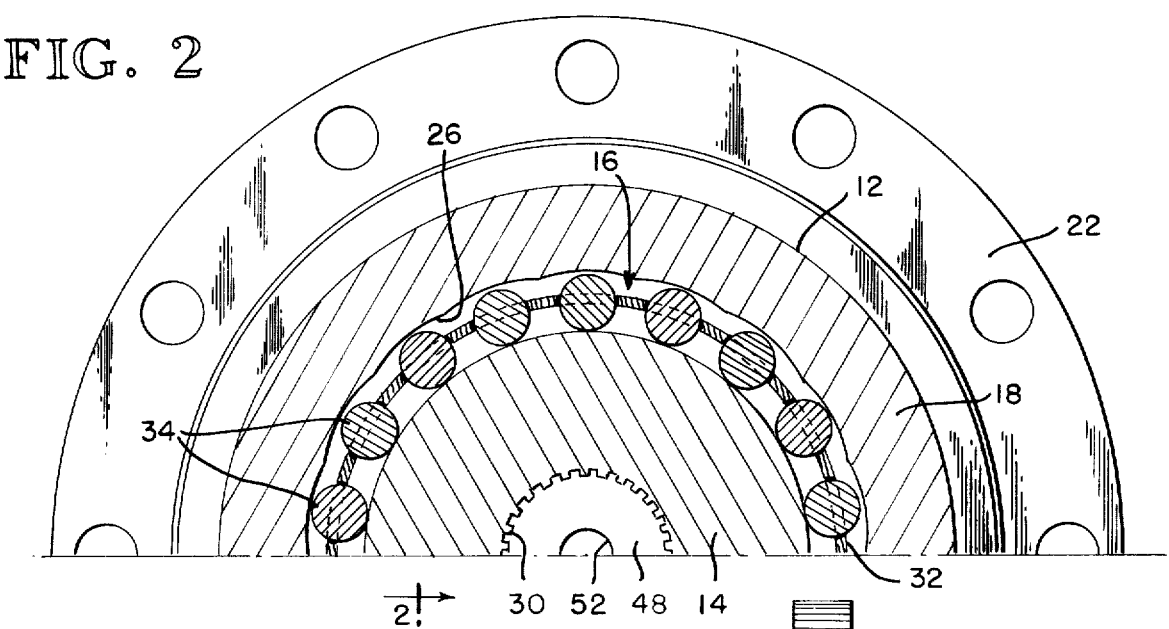
FIG. 2 is a sectional view taken along line 2—2 of FIG. 1.
Figure 1:
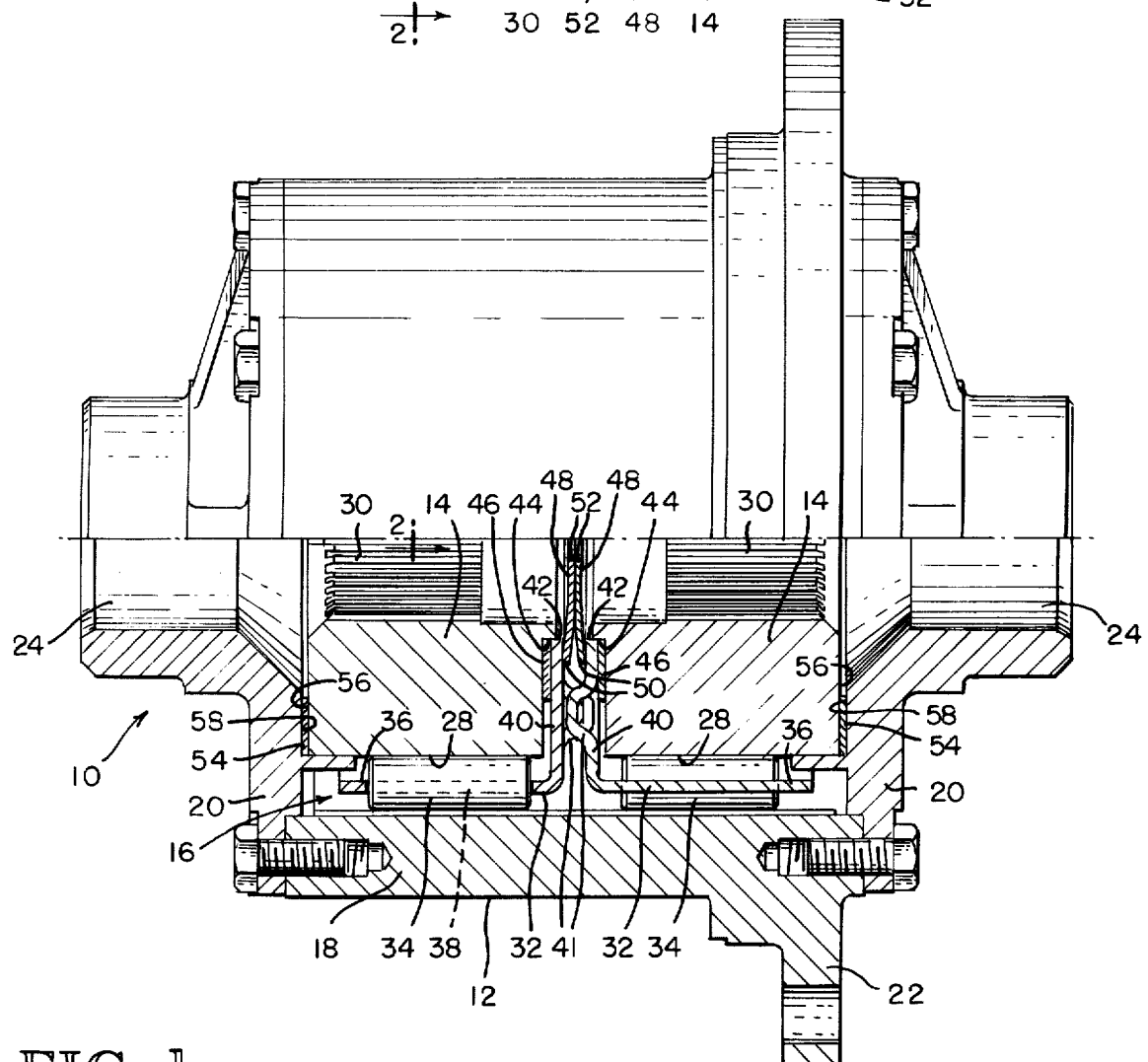
FIG. 1 is a longitudinal view, partly in section, of the drive differential of the present invention.
Figure 3:
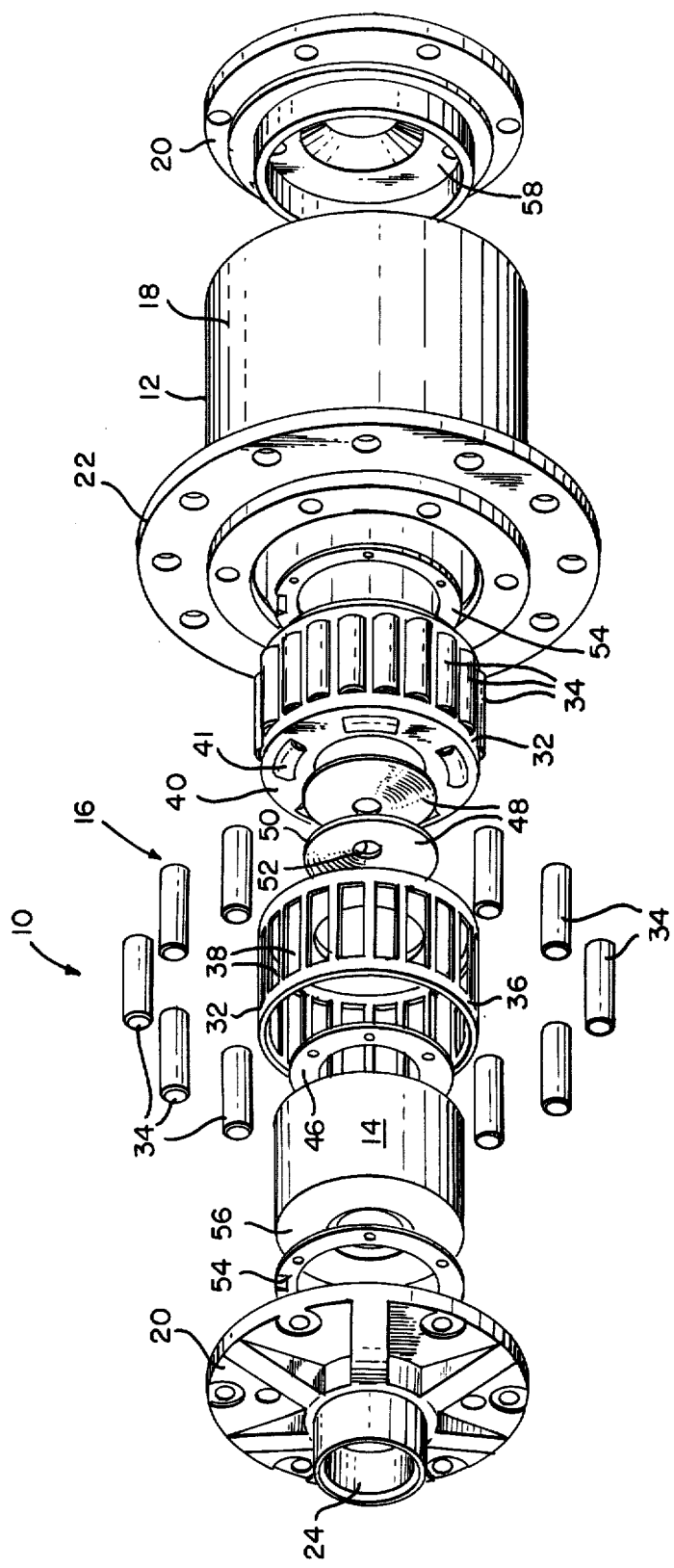
FIG. 3 is an isometric exploded view of the differential of the present invention.

The transmission of the present invention, generally designated 10, comprises an outer drive casing 12, a pair of inner driven hubs 14, and a roller clutch assembly 16 positioned in the annular space between the casing 12 and the hubs 14. In the usual installation in an automotive vehicle, this transmission 10 is positioned between a set of drive wheels of the vehicle (usually the rear wheels), with the power to the transmission being from a main drive shaft (not shown herein) to the drive casing 12, and with the output of the transmission being transmitted from the hubs 14 to laterally extending drive axles (not shown herein) splined each to a related hub 14.

In describing the transmission 10 of the present invention, the term "longitudinal axis" is intended to mean the main axis of rotation of the main components 12–16 of the transmission 10, with the longitudinal axis thus being coincident with the drive axles connected to the transmission 10. The terms, "radially inward" and "radially outward" denote, respectively, location closer to or further from the longitudinal axis of the transmission. The terms, "axially outward" and "axially inward" denote, respectively, location further from or closer to a plane perpendicular to the longitudinal axis and intersecting the axis at a center position between the two driven hubs 14.

The drive casing 12 is formed in three sections which are bolted together to form a substantially unitary structure, these sections being an outer annular housing portion 18, and two side portions 20. The annular housing portion 18 has a radial flange 22 adapted to be connected to a ring gear or other mechanism (not shown herein) by which power is transmitted from a main drive axle to the drive casing 12. The two side portions 20 of the casing 12 each have a longitudinal through opening 24 to accomodate a related one of the drive axles. The inner surface of the outer housing portion 18 of the casing 12 has longitudinally aligned cam or drive surfaces 26 to accomplish the proper clutching action by which power is transmitted to the hubs 14.

The two driven hubs 14 are substantially identical, and each has a cylindrical configuration, with the outer smooth cylindrical surface 28 of each hub 14 functioning as the clutching surface of each hub 14. The center portion of each hub 14 is splined, as at 30, so as to be able to engage a respective drive axle in driving relationship.

The cage assembly 16 of the present invention comprises two interengaging cage members 32 and two sets of cylindrical roller clutch elements 34, each mounted in a respective cage member 32. Each cage member 32 comprises an outer cylindrical portion 36, having a plurality of evenly spaced longitudinal slots 38, to receive in each slot a related roller clutch element 34.

Each cage member 32 has at the axially inner edge of its cylindrical portion 36 a radially inwardly extending flange member 40. These two flanges 40 are proximate one another and reach inwardly between the axial inner ends of the two hub members 14. The two cage flanges 40 are interengaged in a manner to permit limited relative rotation of the two cage members 32. This interengagement is accomplished by forming each of the cage flanges 40 with axially inwardly extending tabs or protrusions 41. These tabs 41 on the two flanges 40 are positioned alternately with respect to one another, and the arcuate width of these tabs is so selected relative to the gaps therebetween to permit relative rotation of the two cages 32 of approximately 3° in either direction.

The radial inner edge 42 of each cage flange 40 is positioned against an annular shoulder 44 at the axially inner and radially inner edge of its related hub 14. There are two brass friction rings 46, one for each hub 14. Each friction ring 46 is positioned against the axially inner surface of its related hub 14, so as to be positioned between the inner end of its related cage flange 40 and hub 14, with its radially inner edge resting against its related hub shoulder 44.

Positioned between the two hubs 14 and between the cage flanges 40 are a pair of spring washers 48 (i.e. Belleville washers), each having the configuration of a shallow truncated cone. Each of these spring washers 48 has an outer circumferential portion 50 that bears against the axially inner face of the flange 40 of its related cage 32, so as to press the flange 40 axially outwardly against its related friction ring 46 which in turn is pressed against the axially inner face of its related hub 14. The radially inner portions 52 of the two spring washers 48 are in contact with one another, so as to enable the outer peripheral portions 50 of the washers 48 to bear against their respective cage flanges 40. The two spring washers 48 are held in their center positions by the interengaging tabs 41 on the cage flanges 40.

It will be noted that the area of contact of the two spring washers 48 is at the inner edges thereof 52, which is quite close to the main longitudinal axis of rotation of the transmission 10, while the outer or peripheral edges 50 of the spring washers 48 are substantially further from the longitudinal axis. As will be described more fully hereinafter in the description of the operation of this apparatus, this permits the two spring washers 48 to rotate relative to one another with relatively less frictional resistance, so that the engagement of the outer spring washer portions 50 with the cage flanges 40 does not inhibit relative rotational movement of the two cage members 32 with respect to one another.

At the axially outer end of each hub 14 there is a brass friction ring 54 positioned between the axially outer face 56 (i.e. end face) of its hub 14 and an opposing annular face 58 on the side portion 20 of the drive casing 12. Each ring 54 is positioned near the radially outward portion of its hub end surface 56. These two brass rings 54 provide frictional engagement between the two hub members 14 and the drive casing 12 so as to prevent clutch chatter in the operation of the transmission.

In operation, power is transmitted to the outer drive casing 12 in a conventional manner, and this power is transmitted through the roller clutch assembly 16 to drive either or both of the hubs 14. Since this general mode of operation of positive drive differentials is well known in the prior art, it will be described only briefly herein. The cam surfaces 26 of the drive casing engage the roller elements 34 so that these elements 34 are wedged between the hubs 14 and the casing 12 in driving relationship. In the event that one of the hubs 14 begins to overrun (this occurring, for example, when the vehicle in which the transmission is mounted is turning a curve, with the outer drive wheel rotating faster than the inner drive wheel), one of the hubs 14 rotates faster than the drive casing 12 and moves out of clutching engagement. However, because of the interlocking tabs 41 of the cages 32 limiting relative rotation of the cages 32, the clutch rollers 34 of the overrunning hub do not become wedged in the opposite direction so as to prevent the free overrun of the hub 14.

Of particular significance in the present invention is the manner in which the particular configuration of this transmission accomplishes the frictional engagement between the cage members 32 and the driven hubs 14, and frictional engagement between the driven hubs 14 and the casing 12. The two spring washers 48 press outwardly against the cage flanges 40, which in turn bear against the friction rings 46 that in turn press against the axially inner surface of each of the hubs 14. This ensures that the cages 32 tend to rotate with the hubs 14 to cause proper clutching engagement of the roller clutch elements 34. Because of the arrangement of the spring washers 48, which engage at their radially inner ends quite close to the longitudinal axis of the transmission 10, the frictional engagement of the spring washers 48 against each other does not impede relative rotation of the two spring washers 48. Thus there is permitted relative rotational movement of the two cage members 32, to permit overrun of either of the hubs 14.

Additionally, the urging of the spring washers 48 outwardly against the hubs 14 causes the two hubs 14 to press each against its related friction ring 54. This causes proper frictional engagement of each of the hubs 14 with the drive casing 12 to prevent clutch chatter. Thus it will be noted that the axially outward urging of the spring washers 48 cause frictional engagement between the cages 32 and hubs 14, as well as between the hubs 14 and the drive casing 12.

What is claimed is:

1. A differential drive mechanism comprising:
   a. a rotatable drive casing having radially inwardly facing clutch surfaces,
   b. a pair of driven hub members coaxially mounted on a longitudinal axis in end to end relationship in the drive casing for independent rotation,
   c. a pair of sets of clutch elements freely mounted between the drive casing and each of said hub members for circumferential movement between a released position and a driven position between the clutch surfaces of the drive casing and the hubs,
   d. a pair of annular interengaged cages holding the clutch elements and permitting limited relative rotation of the sets of clutch elements with respect to one another,
   e. each of said cages having at its axially inner end a radially inwardly extending flange, with the two flanges of the two cages being located proximate one another between the inner axial ends of the two hubs, and
   f. first and second spring members positioned between said cage flanges, said spring members arranged to engage one another and to press axially outwardly each against a related cage flange so as to cause frictional engagement of each of said cage flanges with their related hub member, said spring members having sufficiently low frictional engagement between one another to permit limited relative rotation of said cage members by virtue of the frictional force between the cage members and their related hub members.

2. The transmission as recited in claim 1, wherein said spring members are a pair of spring washers, having radial inner portions which engage one another, and outer circumferential portions which engage related cage flanges to press the cage flanges into frictional engagement with the related hub members.

3. The transmission as recited in claim 2, wherein each of said cage flanges has axially inwardly extending tabs which interengage to permit limited rotation of the cage members, with the outer portions of said spring washers being positioned radially inward of said tabs.

4. The transmission as recited in claim 2, wherein there is a pair of friction rings, each of which is mounted between a related cage flange and an axially inner face of its related hub member, with the frictional force exerted by each ring member between its related cage flange and hub being greater than the frictional force between said spring washers.

5. The transmission as recited in claim 1, wherein each hub member has an axially outer portion frictionally engaging a related axially inwardly facing surface of said casing, with said spring means urging each of said hub members axially outwardly so as to cause the frictional engagement of the two hub members with the drive casing at their engaging faces.

6. The transmission as recited in claim 5, wherein said spring members are a pair of spring washers, having radial inner portions which engage one another, and outer circumferential portions which engage related cage flanges to press the cage flanges into frictional engagement with the related hub members.

7. The transmission as recited in claim 6, wherein each of said cage flanges has axially inwardly extending tabs which interengage to permit limited rotation of the cage members, with the outer portions of said spring washers being positioned radially inward of said tabs.

8. The transmission as recited in claim 6, wherein there is a first pair of friction rings, each of which is mounted between a related cage flange and an axially inner space of its related hub member, with the frictional force exerted by each ring member between its related cage flange and hub being greater than the frictional force between said spring washers.

9. The transmission as recited in claim 8, wherein there is a second set of friction rings, each of which is interposed between the axially outward end of its related hub member and the drive casing, so that frictional engagement between the hub members and the drive casing is through said second set of friction rings.

10. The transmission as recited in claim 9, wherein said second set of rings is spaced radially outwardly from said first set of rings, whereby frictional force exerted by said second set of friction rings is at a location further from the axis of rotation of said hub members.

11. The transmission as recited in claim 5, wherein there is a pair of friction rings, each of which is interposed between the axially outer end of its related hub member and the drive casing, whereby frictional engagement of the hub members with the drive casing is through said set of friction rings.

* * * * *